G. E. HARRISON.
PLOW.
APPLICATION FILED OCT. 31, 1912.

1,076,671.

Patented Oct. 28, 1913.
2 SHEETS—SHEET 2.

Witnesses
Einar Larson
M. Schmidt

George E. Harrison
By Eugene K. Stone
Attorney

UNITED STATES PATENT OFFICE.

GEORGE E. HARRISON, OF SACRAMENTO, CALIFORNIA.

PLOW.

1,076,671.  Specification of Letters Patent.  Patented Oct. 28, 1913.

Continuation of application Serial No. 657,288, filed October 28, 1911. This application filed October 31, 1912. Serial No. 728,950.

*To all whom it may concern:*

Be it known that I, GEORGE E. HARRISON, a citizen of the United States, residing at Sacramento, in the county of Sacramento and State of California, have invented certain new and useful Improvements in Plows, of which the following is a specification.

This invention relates to that class of plows embodying a wheeled frame carrying the shares or disks, and a motor mounted on the frame and operatively connected to the wheels thereof for propelling the same.

It is the object of the invention to provide in a machine of this kind a novel and improved plow suspension which permits the plow beams to be readily removed if the machine is to be used as a tractor or a stationary source of power.

The invention also has for its object to provide means for steadying the rear ends of the plow beams, and for taking up side strain and vibration, thereby preventing the beams from springing out of line when going around curves and corners.

These objects are attained by a novel combination and arrangement of parts to be hereinafter described and claimed, and in order that the invention may be better understood, reference is had to the accompanying drawings, in which—

Figure 1:
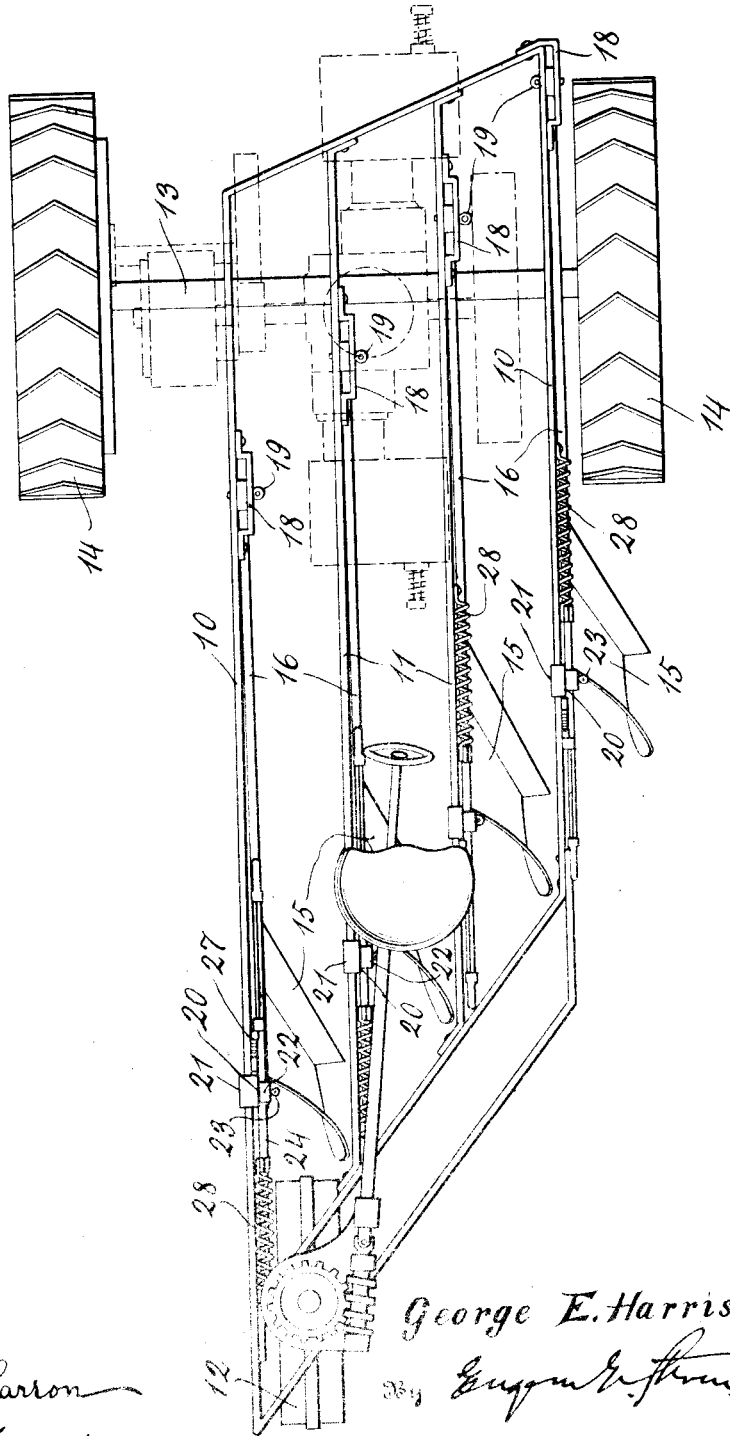
Figures 2, 3:
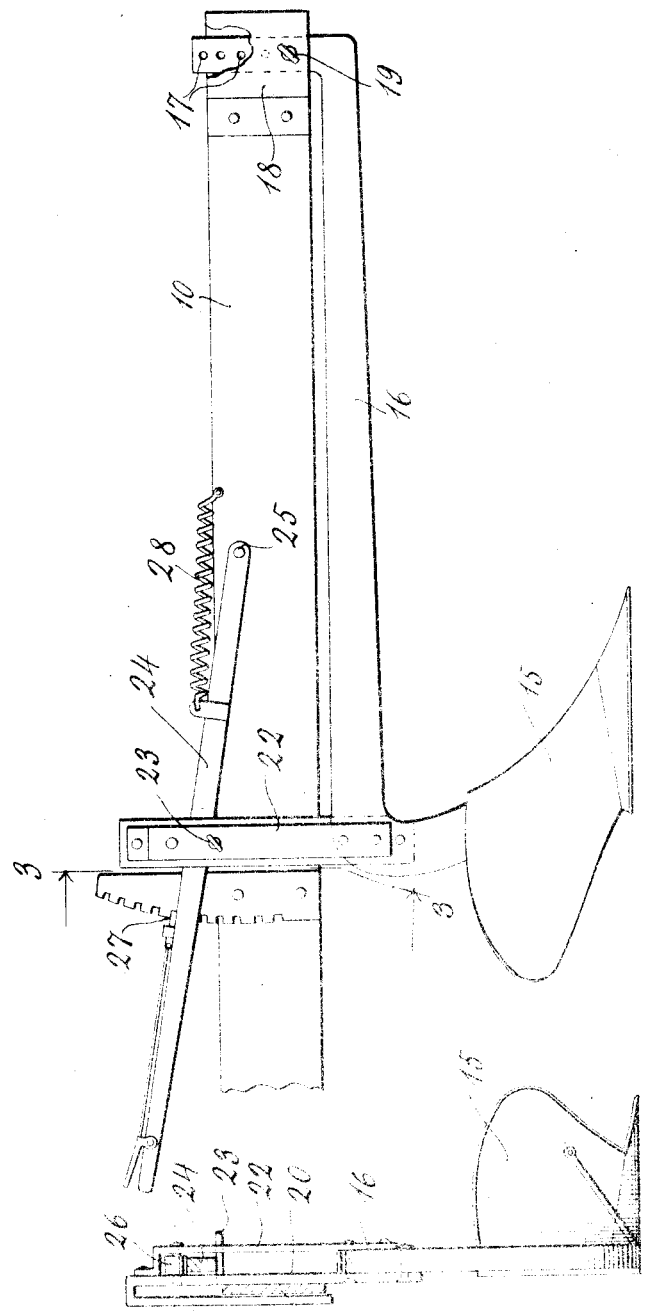

Figure 1 is a plan view of the machine. Fig. 2 is an elevation of the rear end of one of the plow beams showing the suspension means therefor. Fig. 3 is a vertical section on the line 3—3 of Fig. 2.

In the drawings, the main frame of the machine comprises parallel side bars 10 and intermediate bars 11, said bars extending longitudinally and being suitably connected by cross braces. The rear portion of the frame carries a steering wheel 12 provided with suitable operating means which are described in detail and claimed in an application filed October 28, 1911, Serial No. 657288, matured into Patent No. 1047215, of which the present application is a continuation. At the front end of the machine is mounted an axle 13 carrying traction wheels 14.

The motor and drive gearing for operating the traction wheels are shown by dotted lines in Fig. 1, and as these parts are described in detail in the previous application herein referred to, a detailed description thereof is deemed unnecessary.

At 15 are indicated the plow shares, four being shown, and each of which is independently mounted on a plow beam 16. The shares are arranged as usual, obliquely of the line of travel of the machine. The beams of the two outer shares are connected, respectively, to the side bars 10, in front and to the rear of the axle 13, the points of attachment being located the same distances from the axle, and the two intermediate shares are similarly connected to the intermediate bars 11. This arrangement balances the plow beams, and places a greater part of the weight on the traction wheel, where it should be. The draft of the shares also adds to the traction of the wheels, and the deeper the plowing the better will the wheels grip without putting on extra traction strain on the steering wheel 12, where it is not needed and should be avoided as much as possible. The front ends of the plow beams 16 are turned up and provided with a vertical series of perforations 17, and said ends extend into clevises 18 carried by the side and intermediate bars 10 and 11. By means of pins 19 passed through alined perforations in the clevis and bars, and through a selected one of the perforations 17, the vertical adjustment of the plow beams is effected. The plow beams may be provided with disks instead of shares as shown.

The rear end of each plow beam is supported by a bracket having a bend at its upper end to form two parallel laterally spaced side portions 20 and 21, respectively, between which the side or intermediate bar, carrying the beam, loosely extends. To the beam is also fastened a bar 22 which extends parallel to the bracket, in spaced relation with respect to the part 20 thereof, and is secured at its upper end to the corresponding end of said part 20. A pin 23 passes through the parts 20 and 22, above the plow beam, and between said parts 20 and 22, above the pin, passes the intermediate portion of the hand lever 24 pivoted at one of its ends, as indicated at 25, to the frame bar. The plow beam is securely fastened to the lower end of the part 20. In order to reduce friction, an anti-friction roller 26 is mounted between the parts 20 and 22 above the hand lever 24 to engage the latter. The plow beam is thus held suspended from the hand lever, the latter being provided with a suitable locking device 27. By the herein described support for the rear ends of the plow beams, they may be left free to float by removing the pin 23; or, if desired, the beams can be locked down by locking the hand lever 24 and inserting the pin 23, said pin being so located as to extend across the bottom edge of the hand lever. The plow beams can be easily removed, as it is necessary only to lift the supporting brackets off the hand lever. To the pivoted ends of the hand levers are connected springs 28 which assist in raising the beams. The brackets also steady the rear ends of the beams, taking up side strain and vibration, and preventing the beams from springing out of line when going around curves and corners. They also keep the beams from wringing, and make it possible to use disks as well as moldboard shares. The brackets also enable the beams to be readily raised or lowered, and at the same time leaving them free and independent of the frame and of each other. The independent suspension of the plow beams is also advantageous as in the event of one of the shares meeting an obstruction, only that share needs to be lifted to clear the same.

The preferred embodiment of the invention has been shown, but it will be evident that various minor changes in the structural details may be made without a departure from the spirit and scope of the invention.

I claim:

1. A plow comprising a supporting frame, a plow beam carried thereby, a bracket connected to the rear end of the plow beam, a hand lever mounted on the supporting frame from which hand lever the bracket is suspended, said bracket being free to rise relative to the hand lever, locking means for the hand lever, and means for locking the bracket against rising.

2. A plow comprising a supporting frame, a hand lever mounted on said frame, a plow beam suspended at its rear end from the hand lever and free to rise with respect thereto, means for locking the plow against rising, and means for locking the hand lever.

3. A plow comprising a supporting frame, a plow beam carried thereby, a bracket connected to the rear end of the plow beam and having a portion which straddles the supporting frame, a hand lever mounted on the supporting frame, from which hand lever the bracket is suspended, said bracket being free to move vertically relative to the lever, and means for locking the bracket.

4. A plow comprising a supporting frame, a plow beam carried thereby, a bracket connected to the rear end of the plow beam, a hand lever mounted on the supporting frame, abutments on the bracket between which the hand lever extends, the lower abutment being removable to permit the bracket to rise relative to the hand lever, and locking means for the hand lever.

In testimony whereof I affix my signature in presence of two witnesses.

GEORGE E. HARRISON.

Witnesses:
H. B. Harvie,
A. B. Carter.